(No Model.)
J. W. SCOTT.
GATE FOR SHEEP FEEDING YARDS.
No. 285,686. Patented Sept. 25, 1883.
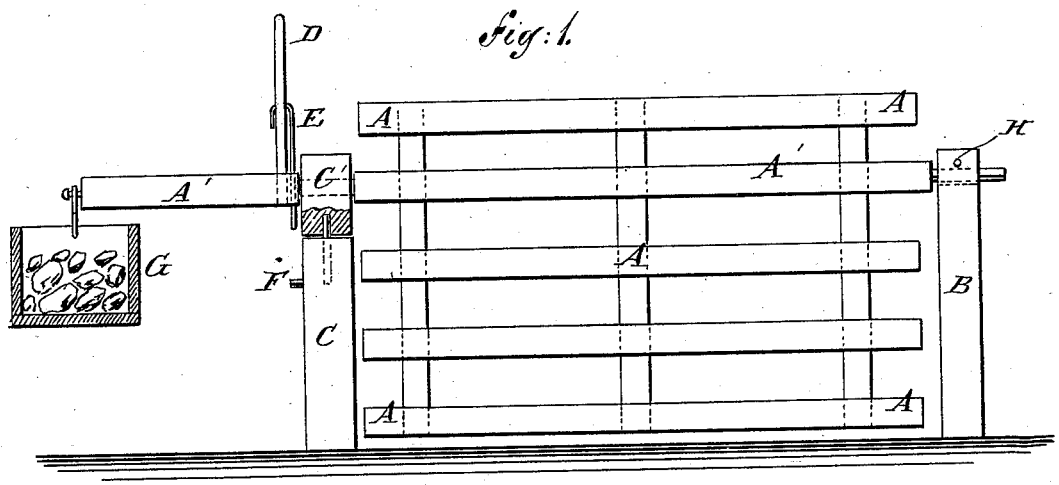
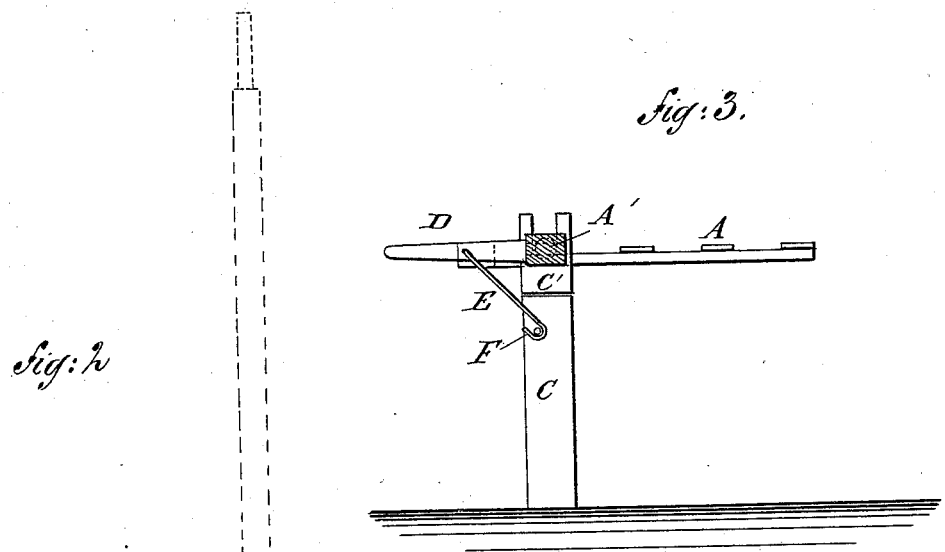
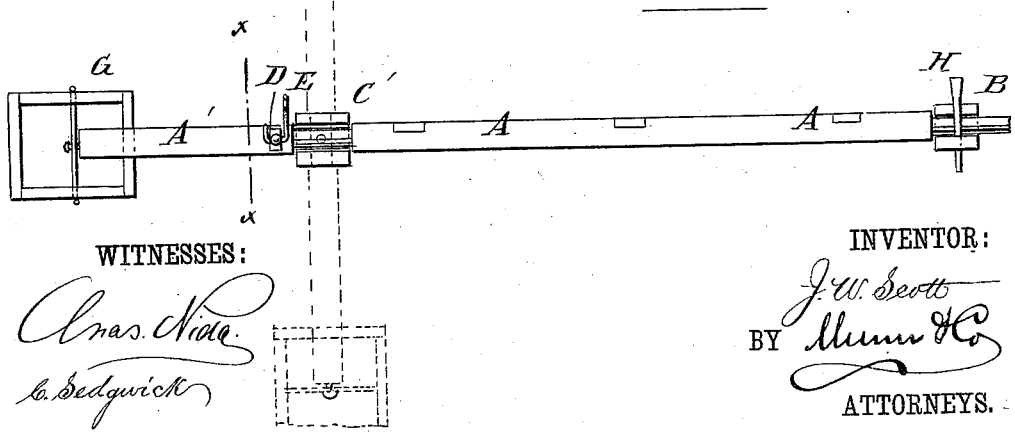
WITNESSES:
INVENTOR:
J. W. Scott
BY
ATTORNEYS.

UNITED STATES PATENT OFFICE.

JAMES W. SCOTT, OF UHRICHSVILLE, OHIO.

GATE FOR SHEEP-FEEDING YARDS.

SPECIFICATION forming part of Letters Patent No. 285,686, dated September 25, 1883.

Application filed May 26, 1883. (No model.)

*To all whom it may concern:*

Be it known that I, JAMES W. SCOTT, of Uhrichsville, in the county of Tuscarawas and State of Ohio, have invented a new and useful Improvement in Gates for Sheep-Feeding Yards, of which the following is a full, clear, and exact description.

Reference is to be had to the accompanying drawings, forming a part of this specification, in which similar letters of reference indicate corresponding parts in all the figures.

Figure 1 is a side elevation of my improvement, partly in section, and part being broken away. Fig. 2 is a plan view of the same. Fig. 3 is an end elevation of the same, partly in section through the line $x\,x$, Fig. 2.

The object of this invention is to facilitate the feeding of sheep.

The invention consists in a gate for sheep-feeding yards, constructed with journals upon the projecting ends of an upper horizontal bar to work in slots in the upper ends of the gate-posts, and provided with a lever-handle, a catch hook and pin, a balancing-weight, and a swiveled bearing, whereby the lower edge of the gate can be readily raised and supported, and the gate can be conveniently opened and closed, as will be hereinafter fully described.

A represents a gate, which may be made of any suitable length, height, and style. The ends of an upper horizontal bar, A', of the gate A, project and have journals formed upon them to rest in slots in the upper ends of the posts B C, as shown in Figs. 1, 2, and 3, so that the lower edge of the gate can be swung upward to allow all the sheep to pass through the gateway at the same time, and in a straight line so that they will come evenly to the troughs, and will thus be fed equally.

To the projecting end of the bar A' is attached the lower end of a lever D, to serve as a handle in swinging the gate A upon its journals.

To the lever D is hinged the upper end of the shank of the hook E, which, when the gate A is swung upward, is hooked upon a pin, F, attached to the outer side of the gate-post C, as shown in Fig. 3, to hold the said gate in a raised position while the sheep are passing through the gateway.

As it is sometimes necessary for teams and large animals to pass through the gateway, the slotted upper part C' of the post C is made separate from and is swiveled to the lower or main part of the said post, so that the said swiveled upper part of the said post C will serve as a pivot in swinging the gate A open and shut.

The bar A' of the gate A is extended and has a box, G, of stone or other weight suspended from a pin attached to the end of the gate-bar to balance the said gate while being swung open and shut, in such a manner that the said weight will not impede the movement of the gate when its lower edge is being swung up and down.

The forward part of the slotted upper end of the post B is shortened, so that the longer rear part will serve as a stop for the journal of the bar A' to strike against, when the gate A is swung shut, to prevent the said journal from passing over the top of the said post.

When the gate is used as a feed-gate, the journal of the bar A' is kept from rising out of the slot in the upper end of the post B by a pin, H, inserted in a hole in the higher part of the said upper end of the post B, as shown in Figs. 1 and 2.

Having thus described my invention, I claim as new and desire to secure by Letters Patent—

A gate for sheep-feeding yards, constructed, substantially as herein shown and described, with journals upon the projecting ends of an upper horizontal bar, to work in slots in the upper ends of the gate-posts B C, and provided with a lever-handle, D, a catch hook and pin, E F, a balancing-weight, G, and a swiveled bearing, C', the parts being constructed and arranged as set forth.

JAMES W. SCOTT.

Witnesses:
 E. A. PARRISH,
 JOHN MILONE.